United States Patent [19]

O'Farrell

[11] 4,157,545

[45] Jun. 5, 1979

[54] CORRELATION RADAR SYSTEM

[75] Inventor: Francis J. O'Farrell, Valencia, Calif.

[73] Assignee: International Telephone & Telegraph Corporation, New York, N.Y.

[21] Appl. No.: 101,361

[22] Filed: Dec. 24, 1970

[51] Int. Cl.² .............................................. G01S 9/06
[52] U.S. Cl. ......................... 343/17.1 R; 343/100 CL
[58] Field of Search ................ 343/5 R, 12 R, 17.1 R, 343/17.2 R, 17.5, 100 CL

[56] References Cited

U.S. PATENT DOCUMENTS 3,480,956 11/1969 Sanderson .................. 343/100 CL X
3,680,101 7/1972 Granqvist ...................... 343/12 R X

*Primary Examiner*—T. H. Tubbesing
*Attorney, Agent, or Firm*—William T. O'Neil

[57] ABSTRACT

A correlation radar system utilizes a switching logic circuit for automatically switching a code word having a predetermined number of bits directly to a transmitter and through a delay to a receiver of the system and, alternately, directly to the receiver and through a delay to the transmitter. By utilizing the switching circuit, the delay need only produce up to one-half the number of bits in the code word.

5 Claims, 8 Drawing Figures

INVENTOR.
FRANCIS J. O'FARRELL
BY
Harvey S. Hertz
ATTORNEY

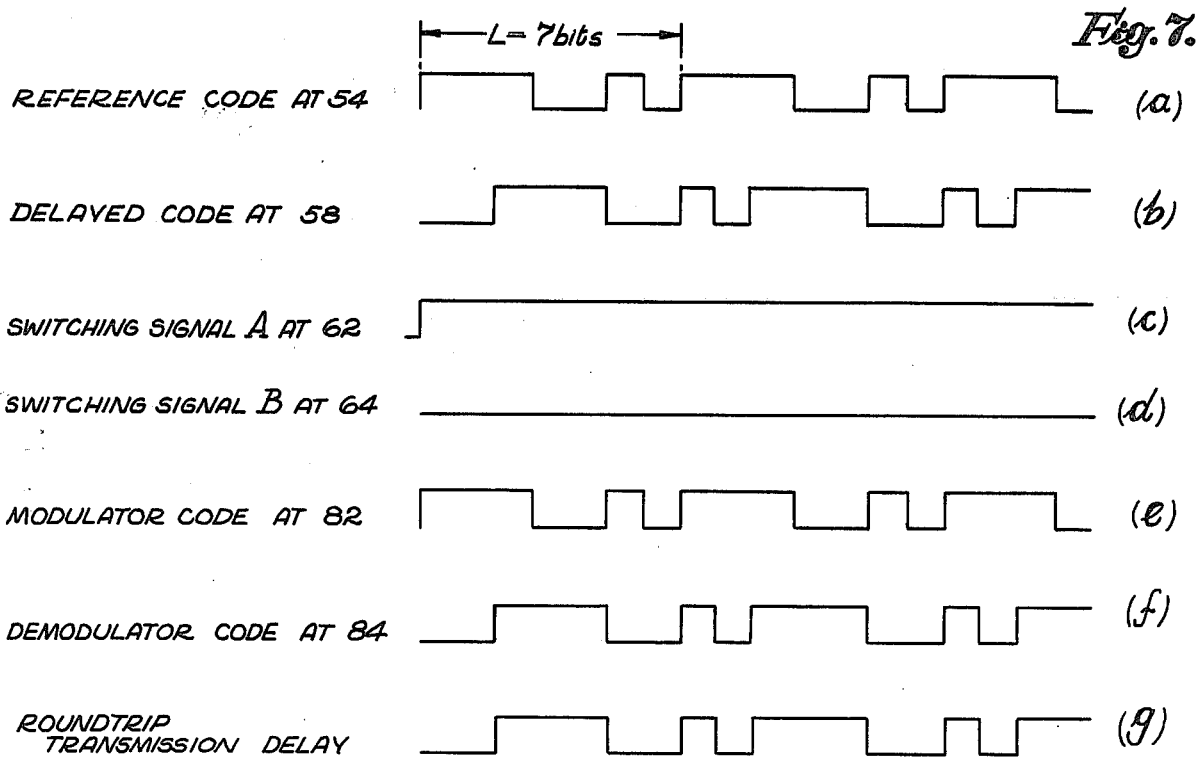
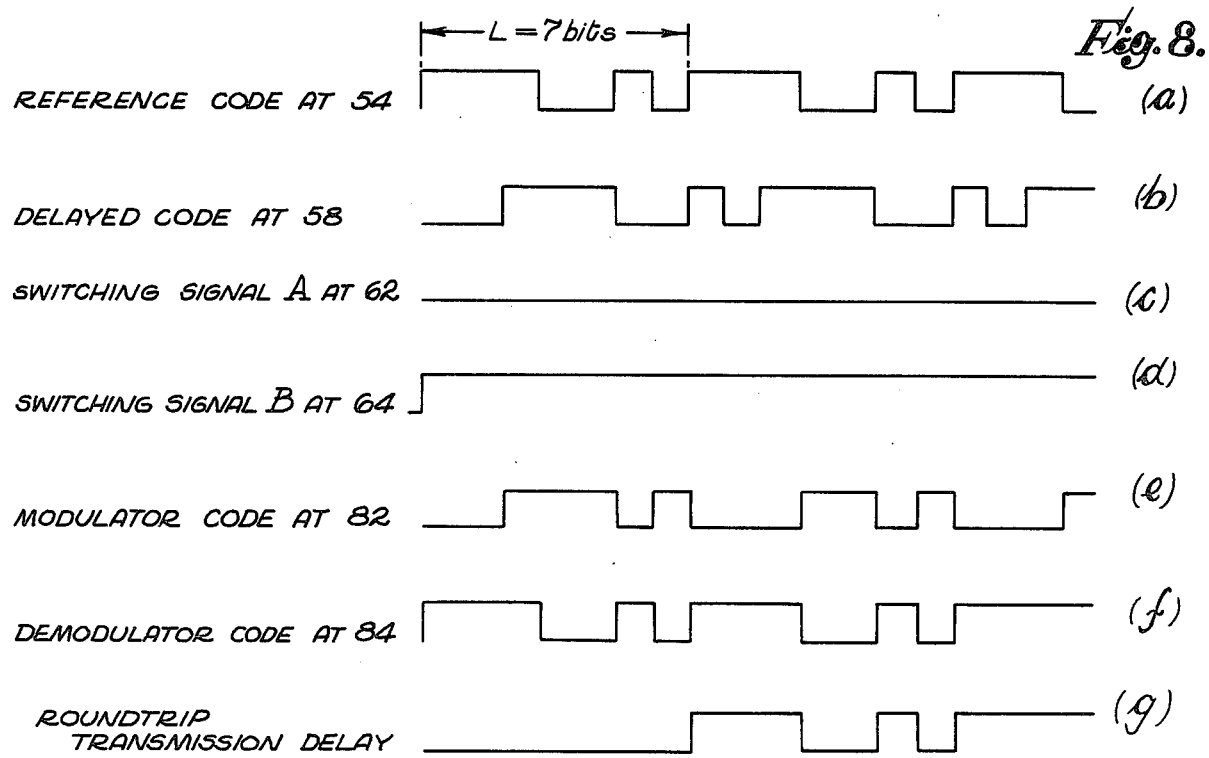

CORRELATION RADAR SYSTEM

The invention relates, in general, to correlation radar systems and, more particularly, to a radar system which includes a dual range correlation capability.

BACKGROUND OF THE INVENTION

In conventional correlation radar systems employing a coded sequence for range gating, echoes are selected throughout the range scale of the radar by correlating the delayed return echo code with an identical matched delayed reference code. Typically, such systems require the use of a large number of delay elements. When a target is at a given range R, there is typically a reflected echo signal which will have undergone a round trip transit time of 2R/C seconds from the transmitter to the receiver where C is the velocity of propagation. By delaying the transmitted reference code by an amount of time equal to the transmitter to target to receiver propagation delay (neglecting component delays) and using the delayed reference code to demodulate the received waveform, a replica of the initial reference carrier will result. Sufficient delays must be included in the delay circuit so that the above-mentioned propagation delay can be reproduced. Thus, large numbers of delay elements are required, the delay elements, of course, being dependent upon the length of the code utilized.

In order to overcome 5, attendant disadvantages of prior art correlation radar systems, the present invention utilizes a switching system wherein the number of delay elements required for the correlation testing throughout the range scale is reduced. By switching the physical placement of a delay in the correlation radar system, a dual range correlating capability is provided with a minimized number of delay elements.

The advantages of this invention, both as to its construction and mode of operation will be readily appreciated as the same becomes better understood by reference to the following detailed description when considered in connection with the accompanying drawings.

BRIEF DESCRIPTION OF THE DRAWINGS

FIGS. 7 and 8 show an example of waveforms employed in the system of FIG. 5.

DESCRIPTION OF THE PREFERRED EMBODIMENT

Figure 1:
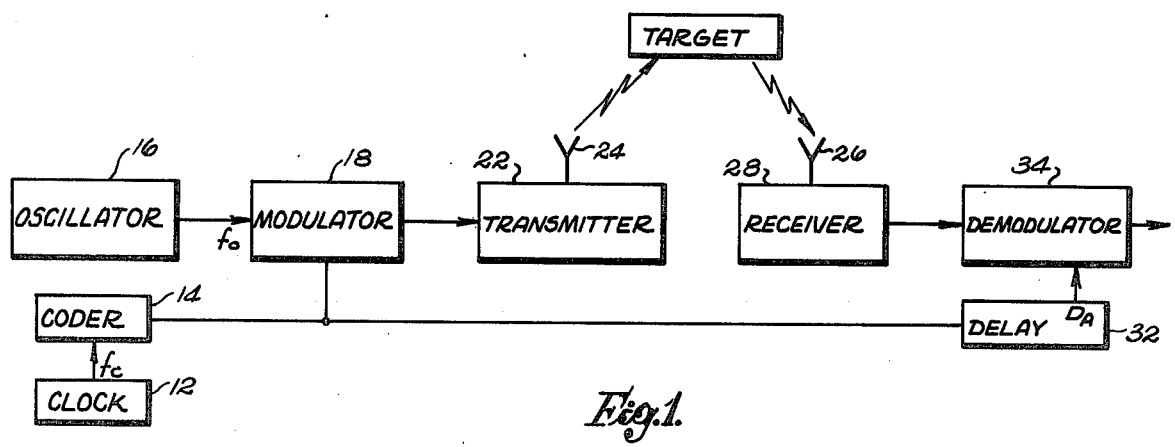
FIG. 1 depicts a schematic block diagram of a prior art coded sequence correlation radar system.

Referring now to the drawings, there is shown in FIG. 1 a typical prior art correlation radar system employing coded sequence for range gating. The system incorporates a clock source 12 which produces clock pulses at a frequency $f_c$ which are coupled to a conventional coder 14 which generates a code word of L bits in length. An oscillator 16 produces output signals at a frequency $f_o$ which are coupled to one input terminal of a modulator 18. The coder 14 generates a code shown in FIG. 2 (a) of L bits in length and is driven by the clock 12. The coder is used to modulate the reference carrier which is coupled from the oscillator 16 to the modulator 18 and the resultant waveform is coupled to a transmitter 22. The output of the transmitter 22 is coupled to a transmitting antenna 24.

Figure 2:
FIG. 2 illustrates an example of waveforms employed in the apparatus of FIG. 1.
Figure 2:
Figure 2:

Reflected signals from a target shown in FIG. 2 (b) are received at a receiving antenna 26 which, in turn, is coupled to a receiver 28. The transmitted reference code from coder 14 is also coupled to an adjustable delay 32 which delays the transmitted reference code by an amount of time equal to the transmitter to target to receiver propagation delays (neglecting component delays). This delayed reference code shown in FIG. 2 (c) is coupled to a demodulator 34, together with signals from receiver 28, and used to demodulate the received waveform. The resultant output of the demodulator will be a replica of the initial reference carrier from the oscillator 16.

To locate a given target with existing correlation systems of the type shown in FIG. 1, the reference code is delayed relative to the transmitted code by an amount of time equal to the round trip transit time as shown in FIG. 2 (b). Thus, for a delay time of $D_a$ seconds and a round trip transit time of 2R/C seconds, correlation with the delayed receiver code of FIG. 2 (c) is achieved when $$D_a = (2R/C) \text{ seconds.}$$

Figure 3:
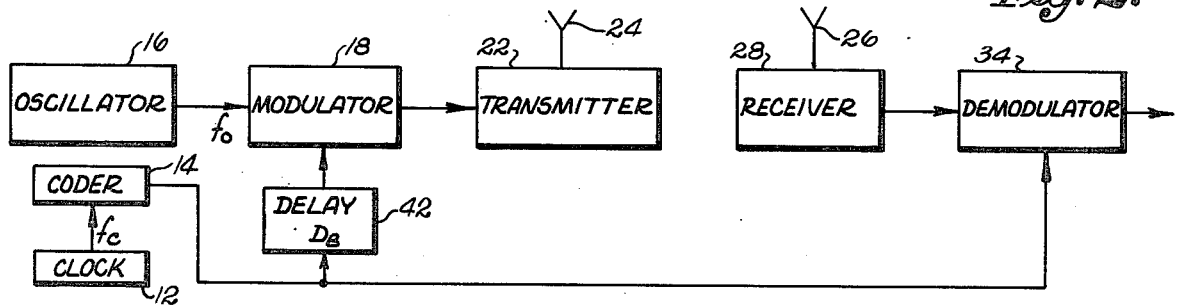
FIG. 3 shows a block diagram of an alternative prior art coded sequence correlation radar system.
Figure 4:
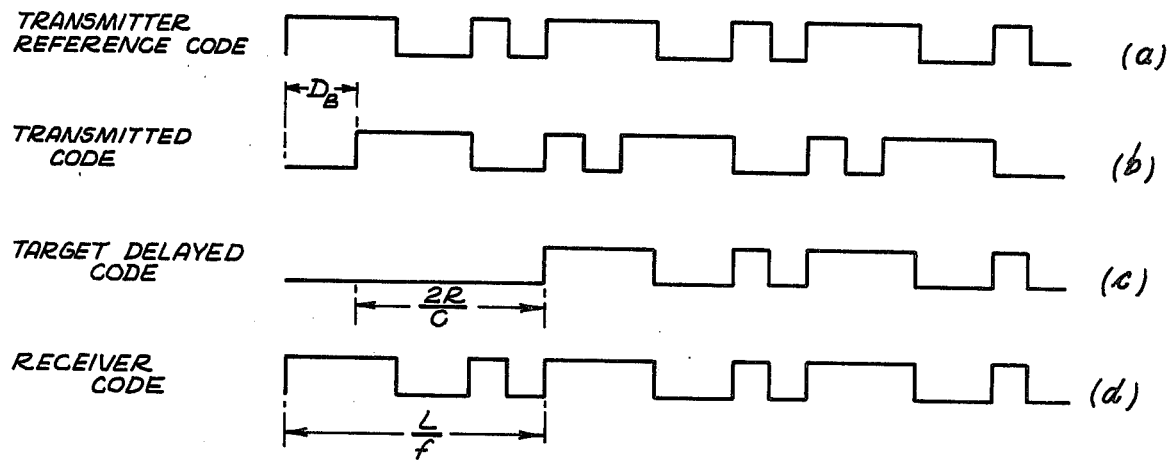
FIG. 4 depicts examples of waveforms employed in the apparatus of FIG. 3.

Referring now to FIG. 3, the transmitted code of FIG. 4 (a) from the coder 14 is coupled to the modulator 18 through a delay network 42 having a delay $D_b$. This delayed code shown in FIG. 4 (b), is coupled to the transmitter 22 and hence to the transmitting antenna 24. The coder is also coupled directly to the demodulator 34. The delayed transmitted code is received at the antenna 26 with a target delay of 2R/C as shown in FIG. 4 (c). To obtain correlation with the system of FIG. 3, the receiver code of FIG. 4 (d) must be adjusted so that the target delayed code of FIG. 4 (c) is in synchronism with the transmitted code.

Since the transmitted code has a total unambiguous range delay of $L/f_c$ seconds, and the round trip to transmitter to target to receiver time is 2R/C seconds, the delay $D_b$ of the delay network 42 is adjusted so that $$D_b = (L/f_c) - (2R/C) \text{ seconds.}$$

When $D_b$ is so adjusted, the transmitted and received codes are in synchronism and the target distance may be readily computed. However, the system of FIG. 3, as well as the system of FIG. 1 requires a variable delay throughout the entire length of the code utilized.

Referring now to FIG. 3, there is shown a range correlation radar system wherein switching means are provided for alternatively switching a delay network from the transmitter leg of the sytem to the receiver leg. Output signals from the coder 14 are coupled to a delay network 52 as well as to the first input terminal 54 of a switching logic circuit 56. Output signals from the delay network 52 are also coupled to a second input terminal 58 of the switching logic circuit. A third and fourth pair of input terminals 62 and 64 form switching signal input terminals to the circuit 56.

Figure 6:
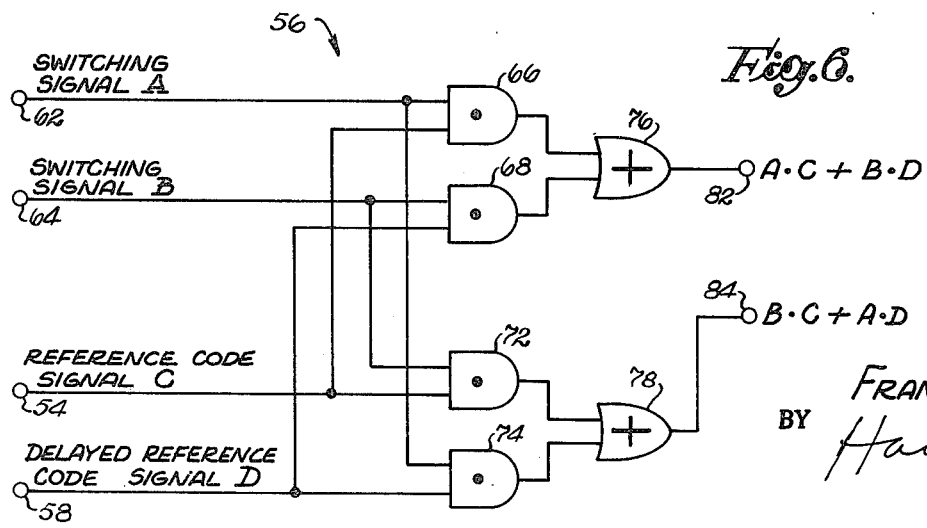
FIG. 6 depicts a typical coded delay switching logic circuit which can be included in the system of FIG. 5.

The switching logic circuit 56 is shown in greater detail in FIG. 6 and comprises a first pair of AND gates 66, 68 and a second pair of AND gates 72, 74. Output signals from the first pair of AND gates 66, 68 are coupled to an OR gate 76 while output signals from the AND gates 72, 74 are coupled to an OR gate 78. In the present case an AND gate produces a "1" or information level output signal when every input differs from the "0" level and an OR gate produces a "1" or information level output signal when one or more inputs differ from the "0" level.

Each of the AND gates 66, 68, 72, 74 has a pair of input terminals. The input terminal 62 is coupled to one of the input terminals of the AND gates 66 and 74, respectively, while the input terminal 64 is coupled to one of the input terminals of the AND gates 68 and 72, respectively. The undelayed reference code signal at terminal 54 is coupled to one of the input terminals of the AND gate 66 and 72, respectively, while the delayed reference coder signal at terminal 58 is coupled to one of the input terminals of the AND gates 68 and 74, respectively. The output terminal 82 of OR gate 76 is coupled to an input terminal of the modulator 18, whereas the output terminal 84 of the OR gate 78 is coupled to an input terminal of the demodulator 34. Switching signals A and B are coupled to input terminals 62 and 74 of the logic circuit. The reference code signal C and the delayed reference code signal D are coupled to the modulator 18 at terminal 82 in accordance with the following logic:

$$A \cdot C + B \cdot D$$

whereas they are coupled to the demodulator 34 at terminal 84 in accordance with the following logic:

$$B \cdot C + A \cdot D$$

Thus, as can be seen in FIG. 7, a reference code shown in FIG. 7 (a), from the coder 14 is coupled to the terminal 54. Further, a delayed code shown in FIG. 7 (b) with a two bit delay is coupled from the delay 52 to the terminal 58. With an informational level signal shown in FIG. 7 (c) applied to the terminal 62 and an "0" level signal shown in FIG. 7 (d) applied to the terminal signal 64, the code signal shown in FIG. 7 (e) is present at the terminal 82 and is coupled to the modulator 18. Further, the delayed code shown in FIG. 7 (f) is present at the terminal 84 and coupled to the demodulator 34. If the round-trip delay from the transmitter to the target to the receiver shown in FIG. 7 (g) is equal to the delay from the circuit 52 or also a two bit delay, then correlation will occur and the target distance can be calculated.

Alternatively, the reference code of FIG. 8 (a) is applied to terminal 54 and the code of FIG. 8 (b) having a delay of two bits applied to the terminal 58, and the zero level signal of FIG. 8 (c) applied to terminal 62 and the informational level signal is applied to terminal 64. The delayed code of FIG. 8 (e) is now applied to the modulator 18 and the undelayed code of FIG. 8 (f) is applied to the demodulator 34. When the signal at the receiver has a transmitter to target to receiver delay of five bits it will be correlated with the undelayed code coupled to the demodulator from terminal 84. It should be noted that the signal at receiver 28 is bit and code word aligned with the undelayed signal at terminal 84 since the original coded signal was of seven bits duration and had a two bit delay through the delay network and a five bit delay in the transmitter to target to delay leg.

Figure 5:
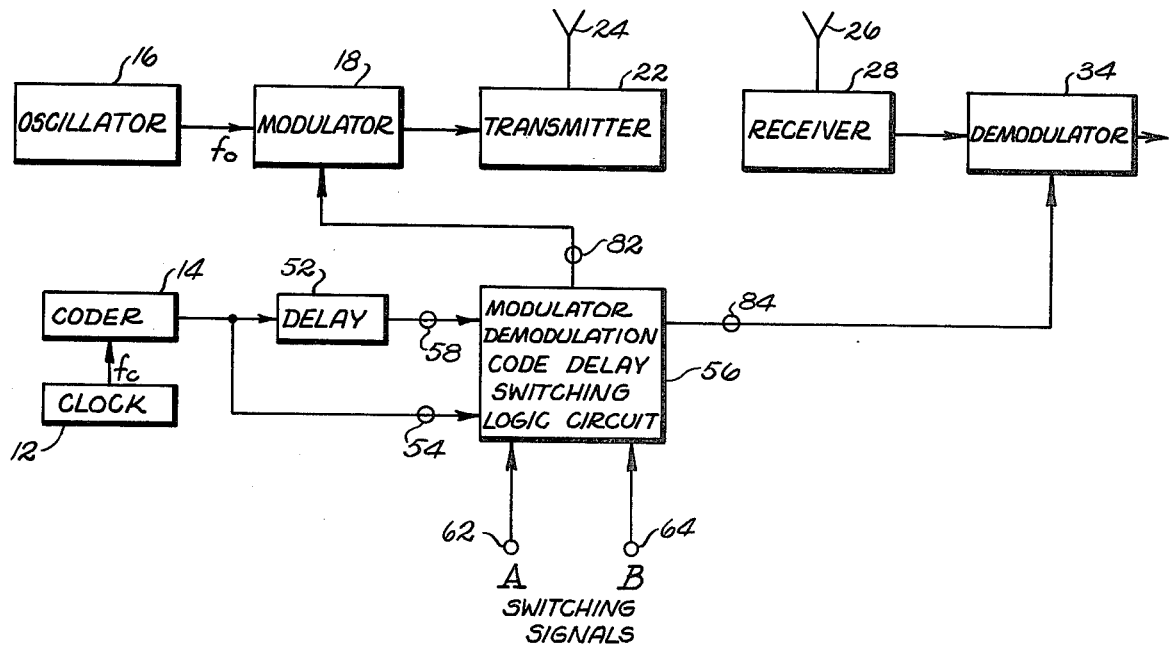
FIG. 5 illustrates a correlation radar system wherein delay switching is provided in accordance with principles of the invention.

Thus, as can readily be seen, the number of delays utilizing the system of FIG. 5 as compared to FIGS. 1 and 3 is substantially reduced. For example, in searching, the seven bit code shown, four delays each one increasing in delay by one bit would be sufficient to search for the entire code rather than using seven delays each increasing in length by one bit as would be required by the embodiments of FIGS. 1 and 3.

Further, it should be noted that the code could be searched by utilizing the switch network of FIG. 6 and automatically switching the delay one bit at a time between the transmitter and receiver leg of the circuit. Alternatively, of course, the delay could be coupled to the transmitter leg of the system and increased up to one-half of the code length one bit at a time, and then coupled to the receiver leg with a delay of one-half of the code word and decreased one bit at a time. Moreover, it should be noted that the delay could be continuous using a variable delay line.

What is claimed is:

1. A correlation radar system having a transmitter circuit and a receiver circuit;
    means for producing a code word of L bits in length at a predetermined frequency;
    a delay network; and
    switching means for coupling said code word directly to said transmitter circuit and through said delay network to said receiver circuit, and alternately coupling said code directly to said receiver circuit and through said delay network to said transmitter circuit.

2. A system in accordance with claim 1 wherein said delay network can produce a delay of up to one-half the number of bits in said code in steps of one bit at a time.

3. A system in accordance with claim 1 wherein said entire code can be searched with said delay producing up to one-half the number of bits of said code word.

4. A system in accordance with claim 3 wherein said code is delayed by said delay network one bit at a time for up to one-half the number of bits of said code word.

5. A system in accordance with claim 1 wherein said entire code can be searched with said delay being continuously variable for an amount equal to one-half the number of bits of said code word.

* * * * *